UNITED STATES PATENT OFFICE.

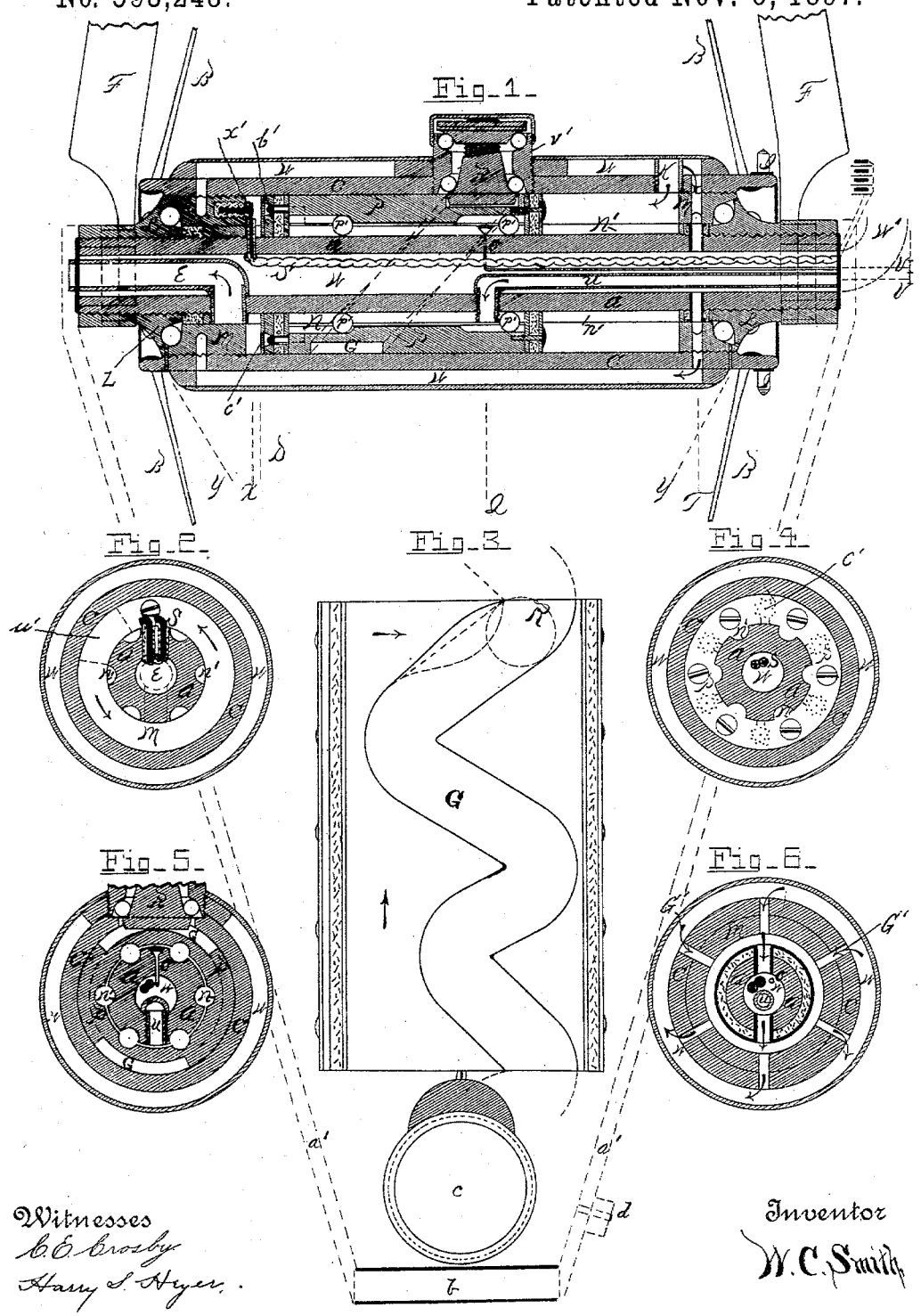

WILLIAM C. SMITH, OF GRAY, MAINE.

CARRIAGE OR CYCLE MOTOR.

SPECIFICATION forming part of Letters Patent No. 593,248, dated November 9, 1897.

Application filed May 8, 1896. Serial No. 590,777. (No model.)

*To all whom it may concern:*

Be it known that I, WILLIAM C. SMITH, a citizen of the United States, residing at Gray, in the county of Cumberland and State of Maine, have invented certain new and useful Improvements in Carriage or Cycle Motors; and I do hereby declare that the following is a full, clear, and exact description of the invention, which will enable others skilled in the art to which it appertains to make and use the same, reference being had to the accompanying drawings, and to letters of reference marked thereon, which form a part of this specification.

My invention relates to improvements in motors for vehicles, and more particularly to motors adapted to be operated by the explosive force of gases.

The drawings herewith accompanying and making a part of this application show the application of my improved motor to a bicycle hub and axle; but the same can be readily applied to other vehicles without changing the essential nature of my invention.

In said drawings, Figure 1 is a central vertical longitudinal section of my improved motor as applied to a bicycle hub and axle. Fig. 2 is a transverse section of the same, taken on line X, Fig. 1. Fig. 3 is a representation of the cam-groove in the periphery of the piston. Fig. 4 is a transverse sectional view of Fig. 1, taken on line D. Fig. 5 is a transverse sectional view of the same, taken on line Q; and Fig. 6 is a transverse sectional view of the same, taken on line T.

Same letters refer to like parts in the several figures.

In said drawings, $a$ represents a hollow axle; C, a hub adapted to rotate thereon. Said hub is mounted on said axle by means of ball-bearings interposed between the ball-cone L and ball-cup $m$, secured to the axle and hub, respectively. Secured in the hub are spokes B. Adapted to reciprocate in the space between the axle and hub is a piston P, having on its inner surface longitudinal grooves $n$, adapted to register with grooves $n'$ in the axle. Mounted in said grooves are antifriction ball-bearings $p'$, which operate also to prevent the piston from revolving on the axle. Extending around the piston is an irregular cam-groove G, and secured to the hub is a cam-roll R, adapted to project into and travel in said groove. The piston has both ends packed and has an open space $z$ between itself and the axle, which may be used as a carbureter, the fine spray of oil entering the carbureter from pipe O, which oil, by reason of the heat absorbed by the piston and the axle from the explosion, is quickly changed to vapor and mixed with air, which enters through pipe U. Owing to the cooling effect of this vaporization in the carbureter, water is needed in the engine only to keep an even temperature. It is admitted to the axle through pipe W' and conducted to the water-jacket W, surrounding the hub, by a series of conduits G' in the ball-cup $m$. (Shown in Fig. 6.) The piston has ball-valves $b'$ at one end, through which the explosive vapor passes to the explosion-chamber, the same being evenly distributed in said chamber by means of minute holes $c'$ in the end of the piston over the ports, in which are ball-valves, as seen in Figs. 1 and 4. The admission of oil and air through pipes O and U to the chamber between the axle and piston may be controlled in any convenient manner, as by valves located in said pipes and valve-operating mechanism. (Not shown.) The fine holes at K allow the air to be drawn in and expelled as the piston reciprocates. The battery-wires S pass through the axle, being properly insulated in the same, the electrodes terminating in the path of a screw-head $x'$, located in the explosion-chamber, whereby the circuit is periodically completed and broken as the hub revolves. The exhaust-passage E is controlled by a depression $u'$ in the inner end of the ball-cup $m$, allowing the gas to escape only when said depression registers with the end of the exhaust-pipe.

The cam-path extends in a zigzag diagonal course around the piston. The part A', which receives the cam-roll at the time the explosion occurs, is inclined at a very acute angle to the length of the piston, so that the roll travels a considerable distance in the path, while it turns the wheel but a short distance.

By reason of the direction of the cam-path presented to the roll at the time when the explosion takes place the shock is greatly lessened, the high pressure at the beginning of the piston stroke being distributed in such a manner as to give an even and constant pressure to the revolving hub. The motor, by using the force of the explosion in the manner described, is capable of exerting more power while undergoing less strain than a common engine. It obviates the use of spring-valves, levers, chains, cranks, gears, piston-rod, and connecting-rods or eccentrics, all the parts being adapted to work automatically. The groove in the piston may have eight, twelve, or sixteen angles. Thus any desired number of impulses may be given at a single revolution of the hub, and each charge may be as small as desired, being governed by the length of the third stroke of the piston. As shown in the drawings, the third stroke is comparatively short, so that a small charge will be sufficient to operate the piston.

The grooves $n$ and $n'$ shown in Fig. 1 should not properly be shown, for from the cross-sectional views it will be seen that the grooves would not be included in a vertical longitudinal section. They are, however, shown for clearness of the description.

The heavy lines in Fig. 6 denote a metal projection for the packing. The ball-cones may be used to compress the packing. The housing $v'$, in which the cam-roll is mounted, may contain lubricating-oil for the motors. Oil-cups may also be inserted in the hub, as at Y Y.

The direction of the groove in Fig. 3 may be varied to adapt it for use with gases of different explosive powers. The receptacles for oil and water and the battery may be suspended in the frame in any convenient manner and connected therefrom with the motor-hub through suitable conduits. Any convenient method of conveying the charge to the explosion-chamber may be employed.

The motor is operated as follows: Suppose a charge to be compressed in the explosion-chamber behind the piston. As the hub revolves the screw-head first completes the circuit by contacting with the electrodes, and then it is broken by the continued revolution of the hub, thus causing a spark which produces an explosion of the gases. The expansion of gas due to the explosion forces the piston longitudinally, causing the cam-roll to travel in the groove and the hub to revolve on the axle. The direction of the cam-path is such that at the moment of the explosion a very acute angle of said path is presented to the cam-roll, as seen in Fig. 3. Consequently the piston may travel with great rapidity and yet give but a moderate rotary motion to the hub, thus obviating the sudden shock otherwise caused. After the completion of the first stroke the exhaust escapes through the exhaust-passage until the second stroke is completed. The third stroke of the piston draws in the gaseous charge which is compressed at the fourth stroke, thus completing the cycle of operations during a single revolution of the hub. The second, third, and fourth strokes of the piston are caused by the momentum of the vehicle.

Having thus described my invention and its use, I claim—

1. In a vehicle-motor, in combination, a hollow axle, a hub, an annular piston adapted to reciprocate between said hub and axle, a cam-path in said piston, a cam-roll adapted to travel in said path and means for operating said piston, substantially as and for the purposes set forth.

2. In a vehicle-motor, in combination, an axle, a hub, a piston adapted to operate between said axle and hub and mechanism connecting said hub and piston whereby the hub is caused to rotate by the operation of the piston.

3. In a vehicle-motor, in combination, a hollow axle, a hub, a water-jacket surrounding the same, ports communicating between the hollow axle and the space between the hub and water-jacket, and means for supplying water thereto, substantially as and for the purposes set forth.

4. In a vehicle-motor, in combination, an axle, a hub, a piston adapted to reciprocate in the space between said hub and axle, longitudinal grooves in the axle or hub, and longitudinal grooves in the piston adapted to register therewith, and antifriction-bearings in said grooves, substantially as and for the purposes set forth.

5. In a vehicle-motor, in combination, an axle, a hub, a piston mounted and adapted to reciprocate between said hub and axle, an irregular groove extending diagonally back and forth around said piston, that part of the groove which receives the first impulse of the explosion bearing a comparatively acute angle to the length of the piston whereby the piston travels a considerable distance with a comparatively small rotation of the hub, substantially as and for the purposes set forth.

6. In a vehicle-motor, in combination, an axle, a hub, a piston mounted in the space between the axle and hub and adapted to reciprocate therein, and an open space between the axle and piston and means for converting a spray of oil into vapor in said space thereby producing a cooling effect, substantially as and for the purposes set forth.

7. In a vehicle-motor, in combination, a hub, a hollow axle, an annular piston surrounding said axle, ball-grooves in the axle and in the piston, adapted to register with each other, antifriction-bearings in said grooves, a zigzag cam-path extending around said piston and a cam-roll in said hub adapted to travel in said cam-path, substantially as and for the purposes set forth.

8. In a vehicle-motor, an axle, hub, and a piston surrounding the axle, a cam-roll in the hub and a cam-path in the piston, that part of said groove through which the roll travels immediately after the explosion being nearly parallel with the length of the piston, substantially as and for the purposes set forth.

In testimony that I claim the foregoing as my own I affix my signature in the presence of two witnesses.

WILLIAM C. SMITH.

Witnesses:
A. E. BOYNTON,
CLARENCE SCOTT.